July 20, 1926.

F. V. TISCHER

STEERING WHEEL

Filed Nov. 3, 1925

Frank V. Tischer, Inventor

July 20, 1926.  F. V. TISCHER  1,593,202
STEERING WHEEL
Filed Nov. 3, 1925    2 Sheets-Sheet 2

Inventor
FRANK V. TISCHER,

Patented July 20, 1926.

1,593,202

UNITED STATES PATENT OFFICE.

FRANK V. TISCHER, OF DAYTON, OHIO.

STEERING WHEEL.

Application filed November 3, 1925. Serial No. 66,646.

My invention relates to steering wheels and in particular to the hub construction thereof.

It is my object to provide a hub construction which is adaptable to conventional steering columns of automobiles which will be fully enclosed and yet will provide the requisite support and strength for wood wheels and the like. It is the object of my invention to provide in such a combination cooperating compression members joining the spokes to one another.

It is a further object to provide means of locking the nuts on the retaining bolts so that they cannot become loosened or separated, thus preventing the disintegration of the steering wheel in its component parts or its detachment from the steering column.

Figure 1:
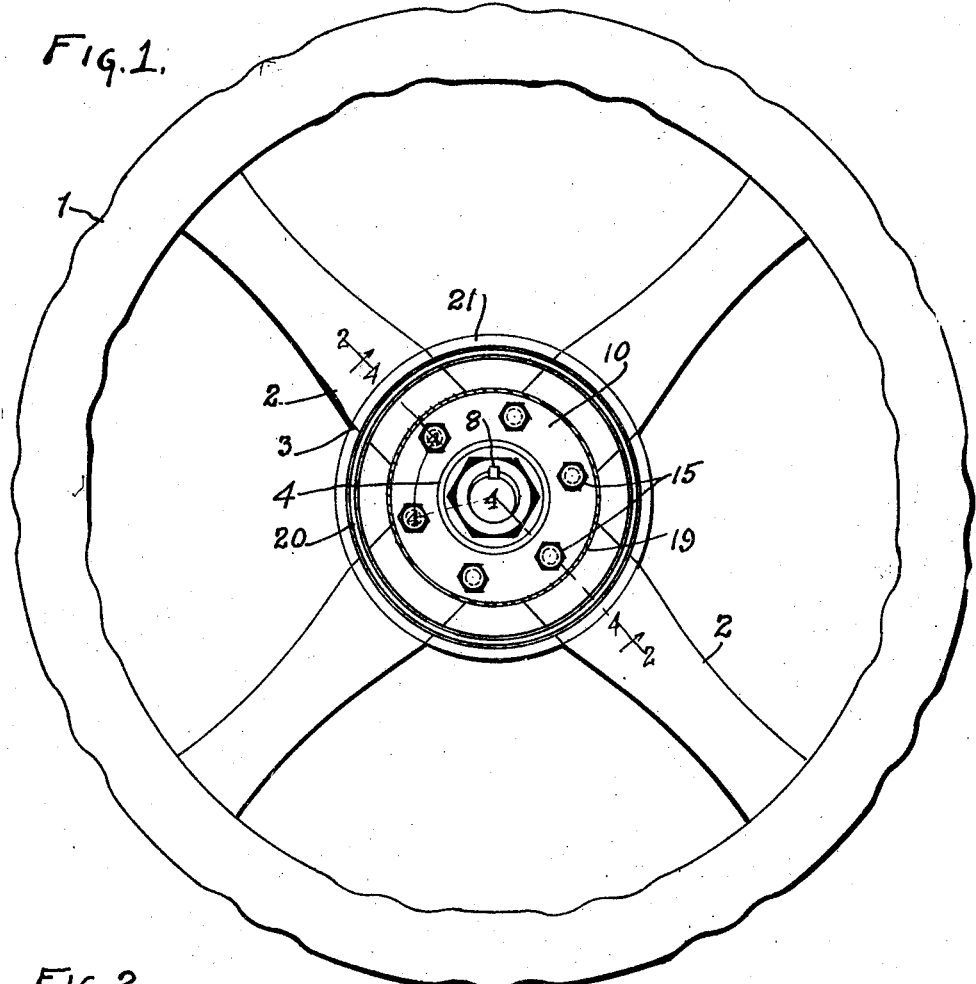
Figure 1 is a plan view of the wheel with the cover plate removed.
Figure 2:
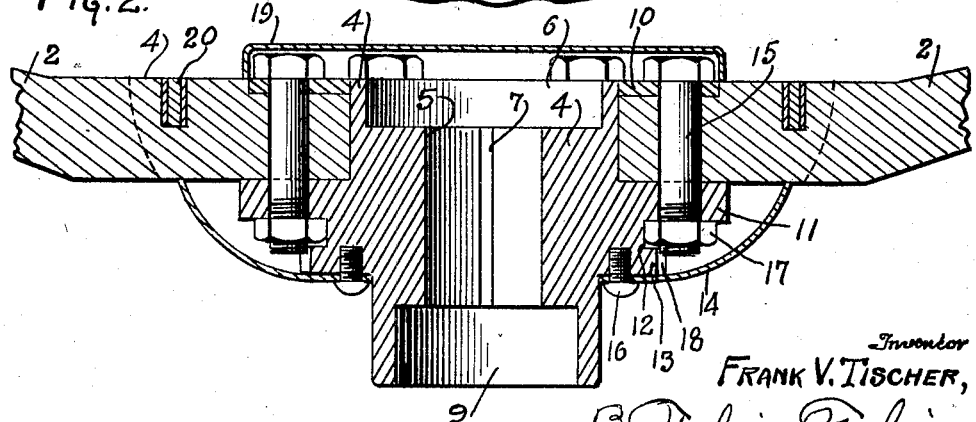
Figure 2 is a section on the line 2—2 of Figure 1.
Figure 3:
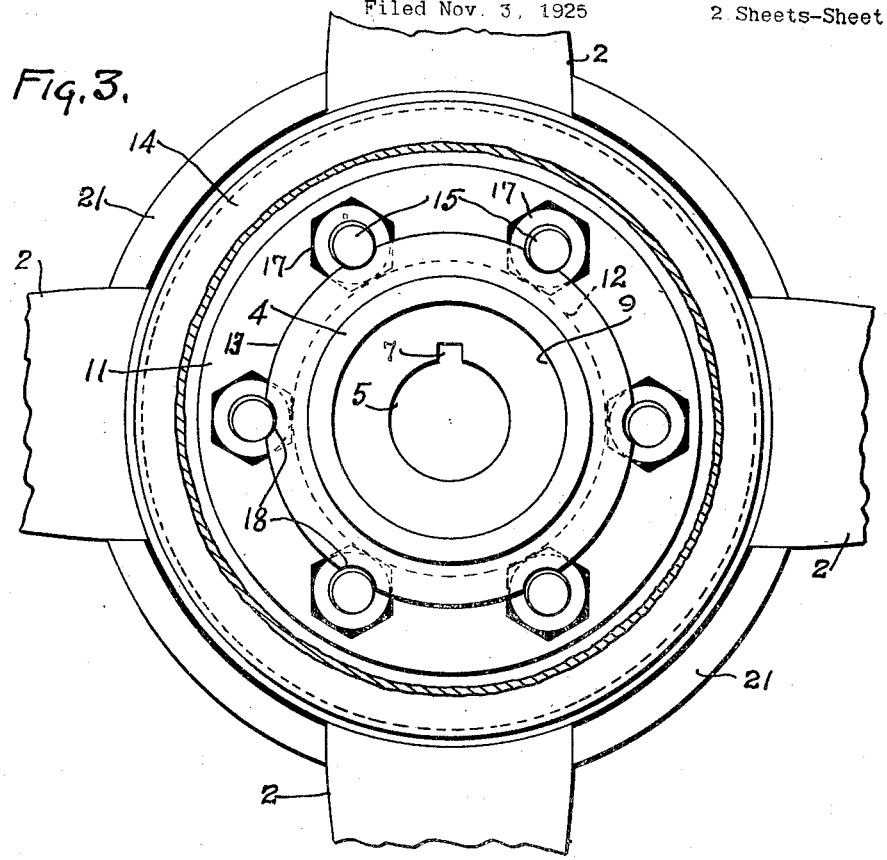
Figure 3 is a bottom view partially in section of the hub construction.

Referring to the drawings in detail, 1 is the rim of a steering wheel having spokes 2, the inner ends of which are mounted in a groove 3 of a hub member 4 through which is an aperture 5 for receiving the steering column. An enlarged aperture 6 at the top thereof is adapted to receive the lock nut on the steering column. The groove 7 provides a key way for the locking key 8. The enlarged lower chamber 9 provides a socket for the head of the steering column so that the hub member 4 may rest thereon.

The principal portion of this hub is not only provided with the groove 3 which is bounded on one side by a cap plate 10 and on the lower side by a spokes supporting plate 11, but is also provided with a second similar groove 12 beneath the spokes supporting plate and above a shoulder 13, beneath which is fastened a lower cap plate 14 which extends from the hub over the ends of the bolts 15 to the spokes of the wheel. This plate is held in position by the screws 16 on the bottom of the hub shoulder 13.

It will be noted that the bolts 15 pass downwardly through the cap plate 10, the inner ends of the spokes 2 the spokes supporting plate 11 and through the groove 12. In this groove is located the nut 17 which, by reason of its engagement of one of its flattened sides with the wall of the groove, cannot turn, so that the bolt can be threaded through the nut and, when the clamping engagement has been made, the nut cannot revolve on the bolt nor can it drop off. The shoulder 13 is cut away at 18 to receive the end of the bolt.

A cover plate 19 is provided on top of the hub for covering the ends of the bolts and the end of the steering column.

In order to further strengthen the wheel in this combination and to form an integral construction, I provide circular laminated reinforcing strips 20 which are recessed in and embedded in the inner ends of the spokes 2. They are also embedded in the spacer blocks or filler blocks 21 between the spokes, the ends of which are projected into the groove 3.

Figure 4:
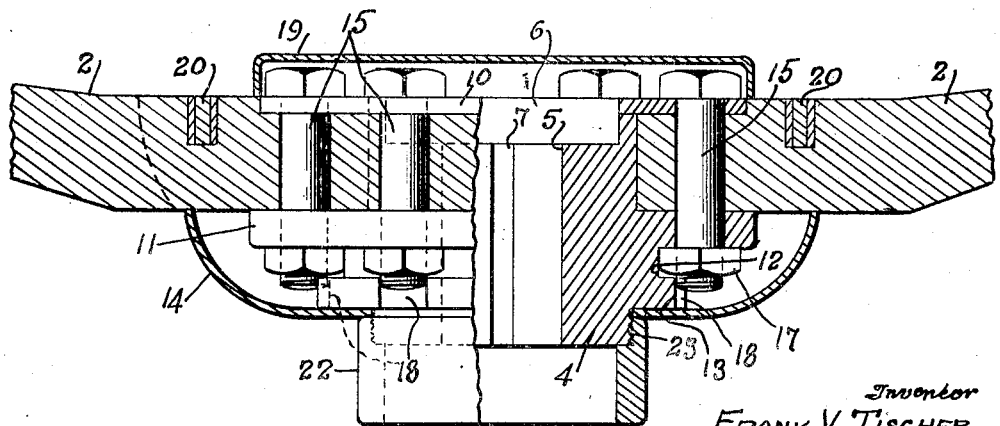
Figure 4 is a section on the line 2—2 of Figure 1 showing a modified form of construction.

Turning to the modification shown in Figure 4, it will be seen that the construction is similar to the other views save that the lower enclosing plate or lower cap plate 14 is held in position by a collar 22 which is threaded at 23 on the hub 4, so that the plate 14 is jammed between the end of the collar and the bottom of the shoulder 13.

It will be understood that I desire to comprehend within my invention such modifications as may be necessary to adapt it to varying conditions and uses.

Having thus fully described my invention, what I claim as new and desire to secure by Letters Patent, is:—

1. In a hub for a steering wheel, means to support a plurality of spokes therein, bolts having screw-threaded ends for securing said spokes to said hub, nuts on said bolts, said hub having a groove adjacent the screw-threaded ends of said bolts adapted to allow the bolts to extend beyond said groove and to receive the nuts carried by the screw-threaded ends of said bolts to prevent them from rotating.

2. A hub for a steering wheel comprising a tubular member having a cut-away portion to receive a plurality of spokes, an annulus adapted to fit around said hub and resting on the inner spoke ends, bolts passing through said annulus, spoke ends and hub, nuts on said bolts, a groove in said tubular member below said spoke receiving portion adapted to receive the nuts carried by said bolts to prevent said bolts from withdrawing from said hub and spokes.

3. In a steering wheel, a hub, means to support a plurality of spokes therein, bolts to bolt said spokes thereto, nuts on said bolts and means for receiving said nuts to prevent their rotation on the bolts, means to reinforce and retain said spokes at a predetermined position, extending from spoke to spoke, and filler blocks also containing means interposed between said spokes and inserted in said hub.

4. In a steering wheel, a hub having means for attachment to a steering column and means to be supported on said steering column, means to receive the inner ends of the spokes into the outer portion of said hub, a cap plate adapted to fit around said hub on said inner spoke ends, bolts adapted to pass through said spoke ends, hub and cap plate, said hub having a groove adjacent the bottom of said bolts adapted to allow the bolts to pass by the side of the hub but adapted to receive the nuts carried on the lower end of said bolts to prevent them from rotating, and nuts therefor.

5. In a steering wheel, a hub having means for attachment to a steering column and means to be supported on said steering column, means to receive the inner ends of the spokes into the outer portion of said hub, a cap plate adapted to fit around said hub on said inner spoke ends, bolts adapted to pass through said spoke ends, hub and cap plate, said hub having a groove adjacent the bottom of said bolts adapted to allow the bolts to pass by the side of the hub nut adapted to receive the nuts carried on the lower end of said bolts to prevent them from rotating, and nuts therefor, and a lower cap plate mounted on said hub extending from the hub over the nuts and bolt ends to the spokes, and a top cap plate over the upper ends of the bolt.

6. In a steering wheel, a hub having means for attachment to a steering column and means to be supported on said steering column, means to receive the inner ends of the spokes into the outer portion of said hub, a cap plate adapted to fit around said hub on said inner spoke ends, bolts adapted to pass through said spoke ends, hub and cap plate, said hub having a groove adjacent the bottom of said bolts adapted to allow the bolts to pass by the side of the hub but adapted to receive the nuts carried on the lower end of said bolts to prevent them from rotating, and nuts therefor, and a lower cap plate mounted on said hub extending from the hub over the nuts and bolt ends to the spokes, and a top cap plate over the upper ends of the bolt, and filler blocks, carried in the margin of said hub between said spokes, and a retaining means embedded in said filler blocks and said blocks for maintaining the parts in engagement with one another and for resisting tortional strain about the steering wheel column axis.

7. In a hub for a steering wheel, means to support a plurality of spokes therein, bolts having screw-threaded ends for securing said spokes to said hub, nuts on said bolts, said hub having a groove adjacent the screw-threaded ends of said bolts adapted to allow the bolts to extend beyond said groove and to receive the nuts carried by the screw-threaded ends of said bolts to prevent them from rotating, a lower cap plate, a portion for supporting said lower cap plate, and detachable means for holding said cap plate in position on said hub.

In testimony whereof, I affix my signature.

FRANK V. TISCHER